United States Patent
Johnson

(10) Patent No.: US 6,857,221 B2
(45) Date of Patent: Feb. 22, 2005

(54) TIP-UP BOBBER STRIKE INDICATOR

(75) Inventor: Bruce Marvin Johnson, 40 Arlington Ave., St Paul, MN (US) 55102

(73) Assignee: Bruce Marvin Johnson, St. Paul, MN (US)

( * ) Notice: Subject to any disclaimer, the term of this patent is extended or adjusted under 35 U.S.C. 154(b) by 0 days.

(21) Appl. No.: 10/278,700

(22) Filed: Oct. 23, 2002

(65) Prior Publication Data

US 2004/0079023 A1 Apr. 29, 2004

(51) Int. Cl.⁷ ............................................. A01K 93/00
(52) U.S. Cl. ..................... 43/44.87; 43/44.88; 43/17
(58) Field of Search ............................. 43/44.87, 44.88, 43/17

(56) References Cited

U.S. PATENT DOCUMENTS

| | | | | |
|---|---|---|---|---|
| 360,418 A | * | 4/1887 | Clark | 43/44.88 |
| 546,771 A | * | 9/1895 | Benoit | 43/44.88 |
| 2,181,458 A | * | 11/1939 | La Gue | 43/44.88 |
| 2,547,308 A | * | 4/1951 | Dean | 43/17.6 |
| 3,214,858 A | * | 11/1965 | Louie | 43/41.2 |
| 3,323,247 A | * | 6/1967 | Murray | 43/17 |
| 3,381,407 A | * | 5/1968 | McDougall | 43/44.91 |
| 3,443,336 A | * | 5/1969 | Reese | 43/44.88 |
| 3,875,695 A | * | 4/1975 | Futch | 43/44.88 |
| 4,167,077 A | * | 9/1979 | Louthan | 43/44.88 |
| 5,404,669 A | * | 4/1995 | Johnson | 43/44.91 |
| 6,009,659 A | * | 1/2000 | Shannon | 43/44.91 |

* cited by examiner

*Primary Examiner*—Kurt Rowan
(74) *Attorney, Agent, or Firm*—Grey Abercrombie

(57) ABSTRACT

This invention relates to an elongated float or bobber placed on a fishing line to indicate when a fish has struck the bait. The novelty resides in features that eliminate the float's resistance normally felt by the fish on the hook. The bobber has a weight of a given size on one end and a tab with a novel slot-hole arrangement on the other end. The line which has a stop thereon is permitted to freely slide along the slot until it reaches the hole, whereupon the stop will be pulled freely through the hole by a fish without exerting any pull on the bobber per se.

1 Claim, 3 Drawing Sheets

Fig I

TIP-UP BOBBER STRIKE INDICATOR

BACKGROUND OF THE INVENTION

1. Field of the Invention

This invention relates to a bobber that is placed onto a fishing line to visually indicate to the fisherman when a fish strikes, while eliminating the normal resistance to the fish caused by the bobber.

2. Description of Related Art

Various patents disclosing Tip-Up Bobbers are known and some are elaborated upon below:

U.S. Pat. No. 2,547,308 Apr. 13, 1951 Dean

Dean discloses a tip-up bobber having a luminous end portion and a second end portion for receiving a line, said line received in a slidable member, said slidable member adapted to slide in response to a fish's pull on the line, thereby tipping the bobber to indicate to the fisherman that a fish has struck. The mechanism disclosed is rather complicated as compared to the presently disclosed invention and does little to eliminate resistance of the bobber.

U.S. Pat. No. 2,181,458 Nov. 28, 1939 La Gue

La Gue discloses a combination float and fish line. The float is hollow and contains a ball that is free to roll around inside the float to produce musical sounds to attract a fish. When a fish strikes, the float will tilt down into the water but note that resistance from said float is always on the line because the float slides down the line until it engages the upper end of the line sinker.

BRIEF SUMMARY OF THE INVENTION

An object of this invention is to provide a tip-up bobber having luminous means associated therewith, and having a novel means to associate the bobber with a fishing line and hook so as to eliminate resistance of the bobber when a fish strikes the line and its hook. It is believed that a bobber does affect and hinder a fish but with my invention, the bobber is sought to be unnoticeable by the fish, and when a fish does strike, no bobber resistance will be felt because of the novel structure of the bobber which will permit the line to move freely relative to said bobber. My bobber has a weight on one end that causes the bobber to land upright in the water until the weighted hook end causes the line to slide through the novel structure until a preset stop on the line engages said structure thereby causing the bobber to rest in a horizontal position. When a fish strikes the hook, the "preset" stop moves relative to said bobber and eventually away from said bobber, thus adding no force of the bobber onto the fish. It is understood that the line is free to move relative to the bobber so the bail or release mechanism on the reel will necessarily be in the open position.

DETAIL DESCRIPTION OF THE INVENTION

Figure 1:
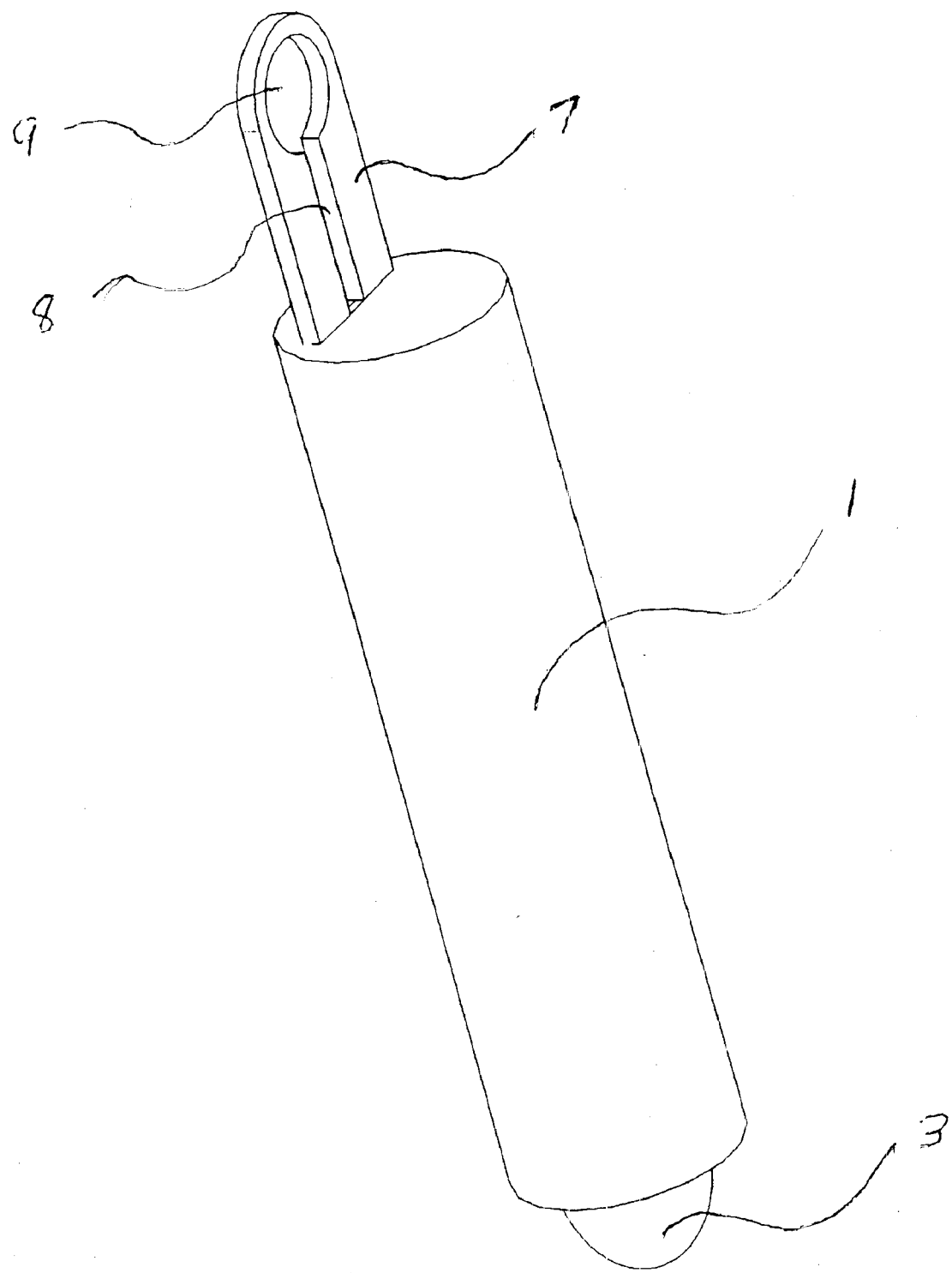
FIG. 1 is a perspective view of the bobber as manufactured including a weighted end and a tab on the other end.
Figure 2:
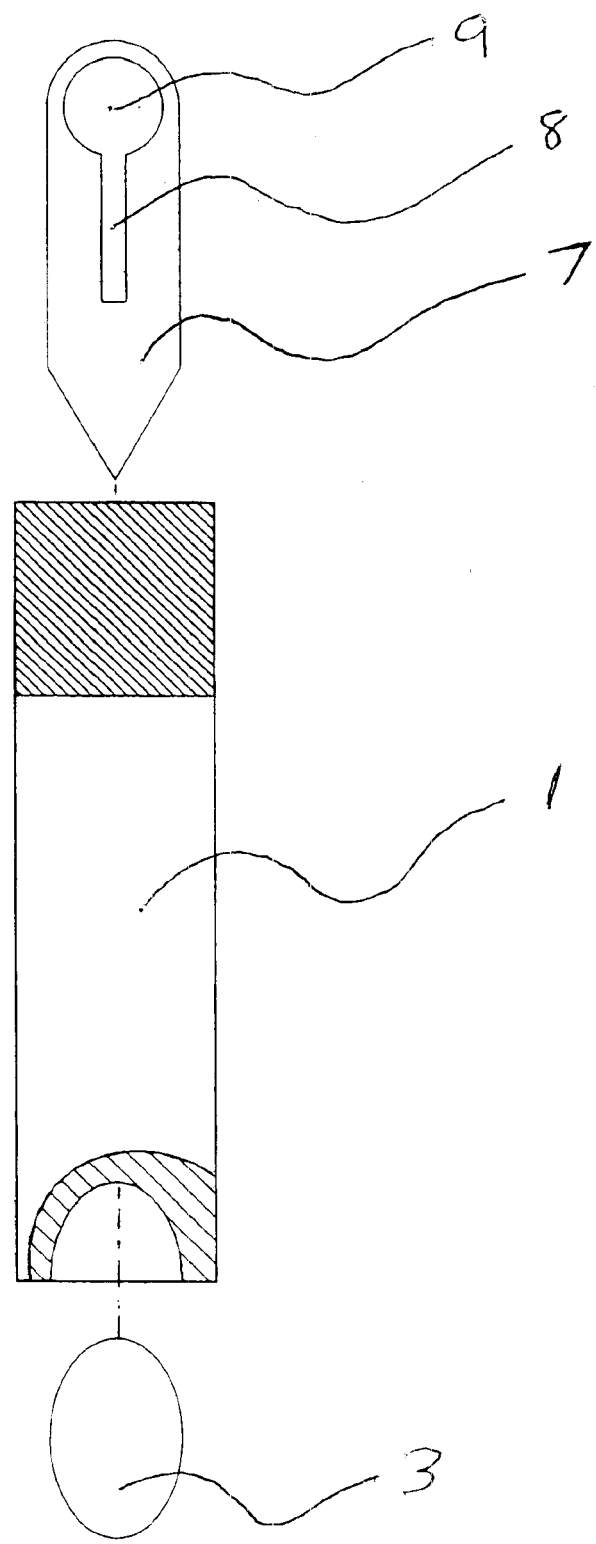
FIG. 2 is an exploded view of the bobber showing the essential parts thereof.
Figure 3:
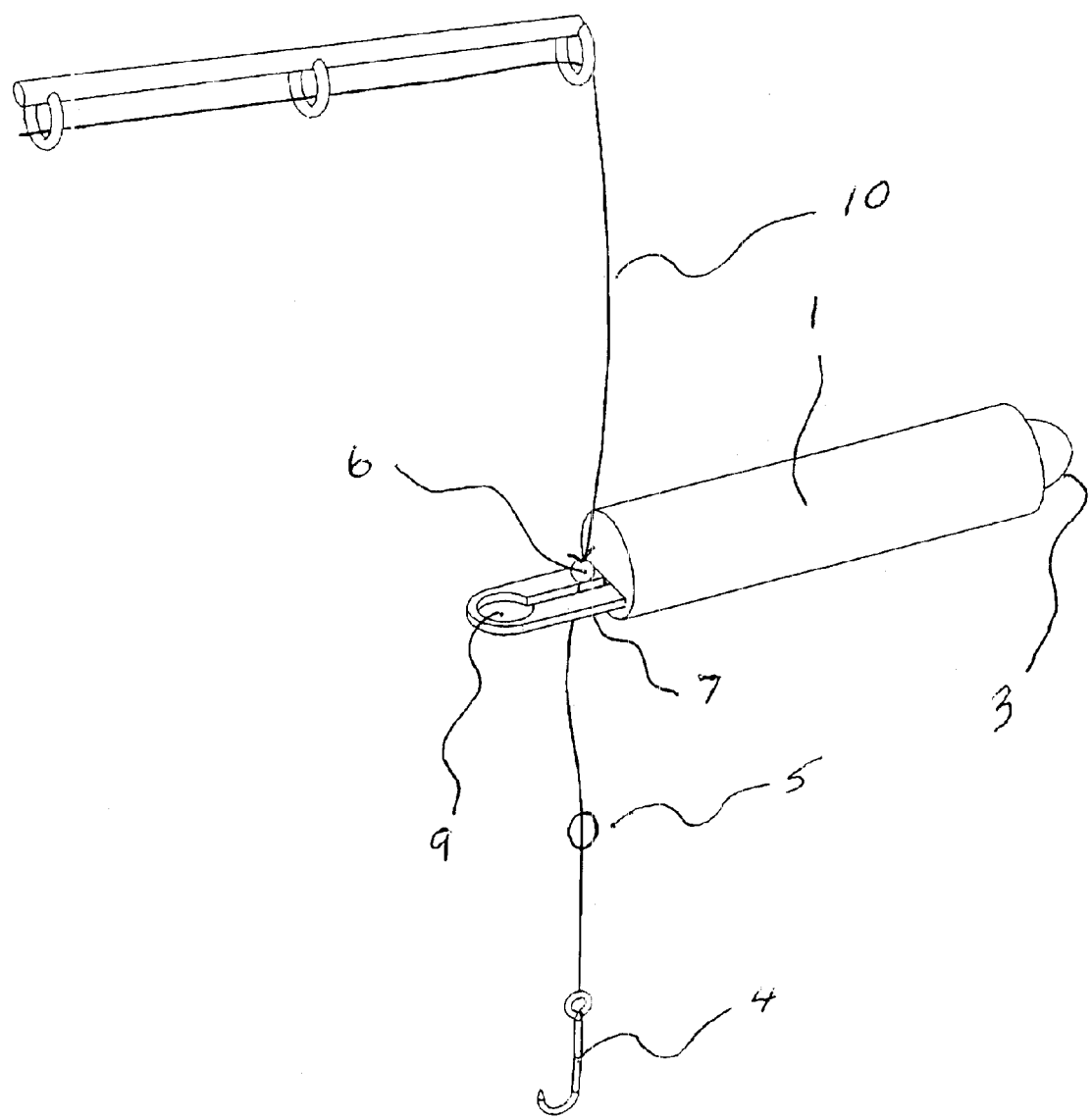
FIG. 3 is a side elevation of the bobber with a fishing line, hook and sinker, all being set for a fishing mode.

Referring to the drawings, FIG. 1 shows inventive bobber ready to be attached to a fishing line. The bobber comprises an elongated body 1 made of suitable foam-like material. Body 1 has a weight 3 fixed in one end thereof and a tab 7 attached at the other end thereof. Weight 3 may be a ⅜ oz. egg slip sinker. Tab 7 is made of 0.020" thick polycarbonate and may be die cut or stamped out by a machine. Body 1 is approximately three inches long by three-quarters inch diameter and is made of whit foam material. Tab 7 has an elongated slot 8 therein extending substantially the length of the tab, said slot terminating in a hole 9 of larger diameter than the width of said slot. The end portion 5 of body 1, FIG. 1, and all of Tab 7 are painted blaze orange, the remainder of body 1 being white. However, other color combinations may readily be used as desired, such being old and well known in the art. Tab 7 protrudes one inch from main body 1 and is inserted ⅝" into said body and glued with waterproof epoxy. Tab 7 is one-half inch wide with a 3/32" slot 8 leading to a ⅜" hole 9. Obviously, these specific dimensions may be varied within the scope of the invention. Likewise, the weights of the sinkers 3 and 5 may be varied within limits. In FIG. 3, a fishing line 10 is shown in position on the novel bobber. Note line 10 has a line stop 6 that rests on tab 7 as hook 4 and weight 5 depend beneath Tab 7 (into the water). Line stop 6 may be spaced as desired by the fisherman to control the depth of fishing. When a fish runs with hook 4, line stop 6 travels along slotted tab 7 until it reaches hole 9; then passing into and through said hole 9, the bail of the reel, not shown, having been released so as to permit the line to slide freely relative to the bobber, thus no resistance of the bobber is transmitted to the fish. Hence, the novelty of this bobber has most likely enabled the fisherman to catch said fish!

From the above disclosure, it can be seen that the invention has resulted in a simplified resistance-free bobber, a bobber that does not alert the fish but one that visually alerts the fisherman, a bobber that serves it's function while eliminating resistance in the line for a fish, a bobber that is easily manufactured, easily applied to a line and easily transported in a tackle box.

I claim:

1. A bobber that will flip to a vertical position when a fish strikes a hook on the line associated with said bobber while maintaining the hook and line in a free traveling mode, thus eliminating resistance on the hook from said bobber comprising an elongated cylindrical body, said body having a first body end and a second body end, a weight fixed within the first body end, an elongated tab fixed to said second body end, said tab having an elongated slot therein and a hole associated with the slot, said slot extending substantially from the second body end to said hole, said hole having a diameter substantially larger than the width of the slot whereby a fishing line, when disposed through said slot with a line stop being placed on said line and said stop resting on an upper surface of the tab with the hook being below the tab, the body and the tab lying on the water in a fishing mode, the stop being free to slide along said slot, into and through said hole, as the hook and line are being pulled by a fish, thus resulting in the fish feeling no resistance from said bobber, wherein once the stop has passed through the hole, the bobber assuming an upright position in the water, alerting the fisherman that a fish has struck.

* * * * *